United States Patent
Rogers et al.

(10) Patent No.: US 10,148,762 B2
(45) Date of Patent: Dec. 4, 2018

(54) PLATFORM-SPECIFIC NOTIFICATION DELIVERY CHANNEL

(75) Inventors: Bruce Rogers, Los Gatos, CA (US); Luke Jonathan Shepard, San Francisco, CA (US); Namita Gupta, Menlo Park, CA (US); Wei Zhu, Cupertino, CA (US); Matthew William Kelly, Palo Alto, CA (US); James Brusstar, San Francisco, CA (US); Yariv Sadan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 447 days.

(21) Appl. No.: 13/276,248

(22) Filed: Oct. 18, 2011

(65) Prior Publication Data
US 2013/0097238 A1    Apr. 18, 2013

(51) Int. Cl.
*G06F 15/16*    (2006.01)
*H04L 29/08*    (2006.01)
*H04W 4/18*    (2009.01)

(52) U.S. Cl.
CPC ........ *H04L 67/141* (2013.01); *H04L 67/2823* (2013.01); *H04W 4/18* (2013.01)

(58) Field of Classification Search
CPC ..... H04L 67/2823; H04L 67/141; H04W 4/18
USPC ....................................................... 709/204
See application file for complete search history.

(56) References Cited

U.S. PATENT DOCUMENTS

| | | | |
|---|---|---|---|
| 6,094,679 A * | 7/2000 | Teng et al. .................... 709/220 |
| 8,838,741 B1 * | 9/2014 | Chandra Sekhar ... H04L 63/168 709/217 |
| 2006/0064476 A1 * | 3/2006 | Decasper et al. ............. 709/223 |
| 2008/0082678 A1 * | 4/2008 | Lorch et al. .................... 709/230 |
| 2009/0119678 A1 * | 5/2009 | Shih ........................ G06Q 10/10 719/313 |
| 2009/0172161 A1 * | 7/2009 | Singh ............................ 709/225 |
| 2010/0191807 A1 * | 7/2010 | Brown et al. .................. 709/204 |
| 2010/0228617 A1 * | 9/2010 | Ransom et al. ............ 705/14.25 |
| 2011/0251970 A1 * | 10/2011 | Oien et al. .................... 705/319 |
| 2011/0289172 A1 * | 11/2011 | Marcellino ............. H04L 51/24 709/206 |
| 2012/0197957 A1 * | 8/2012 | de Voogd ..................... 709/201 |
| 2013/0024851 A1 * | 1/2013 | Firman ..................... G06F 8/60 717/170 |
| 2013/0080613 A1 * | 3/2013 | Thireault ....................... 709/223 |
| 2013/0311551 A1 * | 11/2013 | Thibeault ...................... 709/203 |

OTHER PUBLICATIONS

Introducing the T-Mobile G2 with Google—the First Smartphone Delivering 4G Speeds on T-Mobile's Super-Fast HSPA+ Network, News Release, Sep. 9, 2010, HTC Corporation.*

* cited by examiner

*Primary Examiner* — Normin Abedin
(74) *Attorney, Agent, or Firm* — Baker Botts L.L.P.

(57) ABSTRACT

In one embodiment, a social networking system the social networking system filters content objects based upon the compatibility between the application and the detected device platform. In particular embodiments, content objects are only displayed on a particular platform if there exists an optimized version of the application generating the content object for the particular platform.

17 Claims, 6 Drawing Sheets

PLATFORM-SPECIFIC NOTIFICATION DELIVERY CHANNEL

TECHNICAL FIELD

The present disclosure relates generally to a social networking service and, more particularly, to delivering notifications to users via a plurality of heterogeneous communications channels.

BACKGROUND

A social networking system, such as a social networking website, enables its users to interact with it and with each other through the system. The social networking system may create and store a record, often referred to as a user profile, in connection with the user. The social networking system may generate a personalized set of content objects to display to the user, such as a newsfeed of aggregated stories of the user's first-degree connections. A user may also install third-party applications by allowing applications to access their user profile and other data. The user may access the social networking system through a plurality of unique communication channels, such as through an HTTP request from a computer browser, an HTTP request from a mobile web browser, or a direct TCP/IP connection from a native application.

SUMMARY

Particular embodiments relate to providing content objects to a user regardless of the communication channel through which the user device is communicating with the social network. In particular embodiments, the social networking system filters content objects based upon the compatibility between the application and the detected device platform. These and other features, aspects, and advantages of the disclosure are described in more detail below in the detailed description and in conjunction with the following figures.

DETAILED DESCRIPTION

Figure 1:
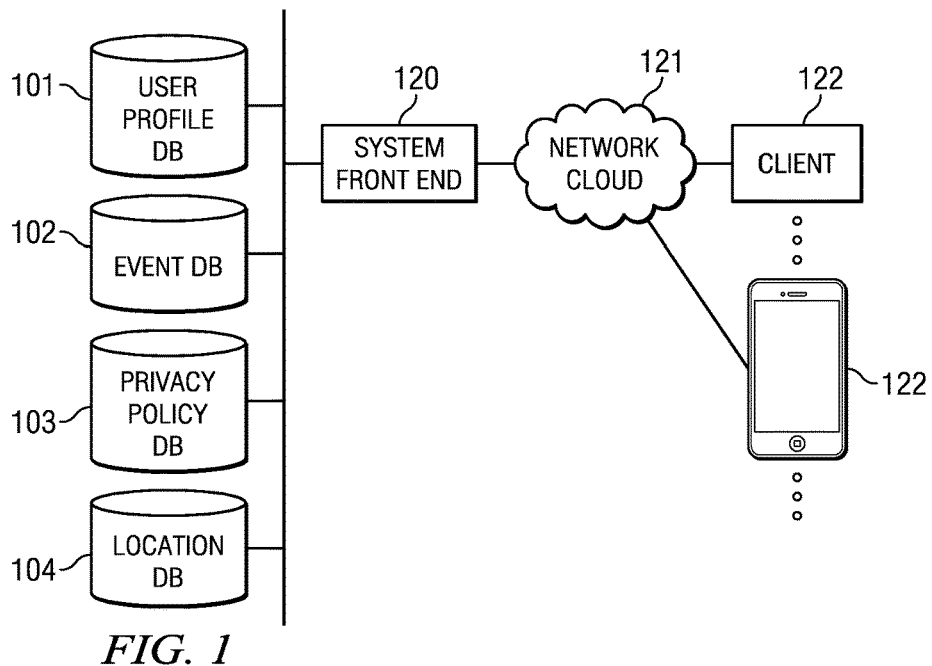
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

A social networking system may support a news feed service. A news feed is a data format typically used for providing users with frequently updated content. A social networking system may provide various news feeds to its users, where each news feed includes content relating to a specific subject matter or topic. Various pieces of content relating to a particular topic may be aggregated into a single news feed. The topic may be broad such as various events related to users within a threshold degree of separation of a subject user, and/or updates to pages that a user has liked or otherwise established a subscriber relationship. Individual users of the social networking system may subscribe to specific news feeds of their interest. U.S. Pat. No. 7,669,123, incorporated by reference in its entirety for all purposes, describes a system that can be used to dynamically provide a news feed in a social networking system. A group of related actions may be presented together to a user of the social networking system in the same news feed. For example, a news feed concerning an event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

Newsfeed stories may additionally be generated by third-party applications, for example, when a first-degree connection of the user performs a specific action on a third-party application. For example, when a friend of the user breaks a particular milestone in a game provided by a third-party, the third-party application may spam all the friend's first-degree contacts (including the user) as a method of promoting the game. While this form of application promotion is generally of low value to users, other third-party applications may generate stories that are posted to the newsfeed of a user that are of slightly more value. For example, a friend of a user may use the application RunKeeper, and post a story to the friend's wall (which is subsequently displayed on the newsfeed of the user) allowing others to view the course, distance, pace, and other statistics about the friend's run.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS)

or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention. The check-in activity may also be displayed on a user profile page and in news feeds provided to users of the social networking system.

Additionally, social networking system may provide various communication channels for users to interact with each other. In addition, other communications channels not intermediated or facilitated by the social networking system also allow users to interact. Thus, users of a social networking system may interact with each other by sending and receiving content items of various types of media through the communication channels. In particular embodiments, communication channels may include, but are not limited to, email, instant messaging (IM), text, voice or video chat, and wall posts. A user of the social networking system may also interact through various communication channels outside the social networking system with another person (a user or non-user of the social networking system). Examples of those communication channels are phone call though public switched telephone network (PSTN) or the Internet (e.g., VOIP or voice over internet protocol), text, voice or video chat, SMS (short message service) text messaging, instant messaging, and email. To keep track of communication channel information, a user of the social networking system may keep one or more address books. An address book may contain one or more contacts (e.g., a person or a business identify) and for each contact, a name and communication channel information for the contact (e.g., a phone number, a user ID for an IM service, an email address, a user ID for a social networking system, home address, etc.). A user of the social networking system may keep the one or more address books inside or outside the social networking system. For example, the social networking system may maintain an address book for a user, and the user can access the address book though the social networking system's web site, or through a client application hosted by a client device 122.

For example, a user may keep an address book in connection with a client application hosted locally by the user's personal computer (e.g., Microsoft Outlook), or keep an address book in a native address book application supported by the user's mobile phone. For example, a user may keep an address book hosted over the Internet by a remote server (i.e., the address book is hosted "in the cloud") and access the address book via a web browser on a client device 122. In other implementations, an address book database may be synchronized between the client device 122 and the social network system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end 120 and news feed engine 110. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, a user of the social networking system may upload one or more media files to media database 105. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 105.

In particular embodiments, user profile database 101 may store communication channel information and an address book of a user. The address book, in one implementation, may be a superset or a subset of the users of the social networking system that a user has established a friend or contact relationship. A user of client device 122 may access this address book information using a special purpose or general purpose client application to view contact information. In particular embodiments, the address book may contain one or more contacts (e.g. a person or an business entity), and a name (e.g., first name, and/or last name) and communication channel information for each contact (e.g., a phone number, a user ID for an IM service, an email address, a user ID for a social networking system, home address, etc.). For at least a portion of the address book information, the contact entries may be dynamic in that the contact entry is associated with a user of the social networking system that maintains his or her own account and corresponding user profile with contact information. Accordingly, when a first user changes any aspect of contact information, the revised contact information may be provided to requesting users. In particular embodiments, a user may access the address book, look up and connect to a contact through a communication channel.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. In particular embodiments, location database 104 may store geo-location data identifying a real-world geographic location of an object, such as a mobile device. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid of the shape. For example, additional information of a place can be business hours, photos, or user reviews of the place. In particular embodiments, location database 104 may store a user's location data. For example, location database 104 may store a user's check-in activities. For example, a user can create a place (e.g., a new restaurant or coffee shop) and the social networking system can store the created place in location database 104. For example, location database 104 can store a user's search activity.

In particular embodiments, news feed engine 110 may access user profile database 101, event database 102, location database 104 and media database 105 for data about a particular user of the social networking system, and assemble a list of one or more activities as news items about the particular user. In particular embodiments, news feed engine 110 may access privacy policy database 103 and determine a subset of news items based on one or more privacy settings by the particular user. In particular embodiments, news feed engine 110 may compile a dynamic list of a limited number of news items about the particular user in a preferred order (i.e., a news feed). In particular embodiments, news feed engine 110 may provide links related to one or more activities in the news items, and links providing opportunities to participate in the activities. For example, a news feed about a user can comprise the user's wall posts, status updates, comments on other users' photos, and a recent check-in to a place (with a link to a web page of the place). In other embodiments, news feed engine 110 may access user profile database 101, event database 102, location database 104 and media database 105 and compile a dynamic list of a number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event.

A first user using a client application that displays graphical representations of other users (e.g., pictures, avatars, etc.)—for example, an address book, a IM chat application, and the like—may desire to quickly view status or related current information about the users without having to switch to a browser application or a special-purpose application. Furthermore, with an abundance of information available for each user in the social networking system, and often limited size of a computer user interface (e.g., a screen of a mobile phone), it may be desirable to display a user's information in a compact, organized, and easily accessible format. Particular embodiments herein describe methods of receiving a selection of a user in connection with a first user interface of a client application, accessing a remote store of user profile information, and displaying the selected user's information in a modular, expandable, and selectable frame overlaying the first user interface of the client application.

Figure 1A:
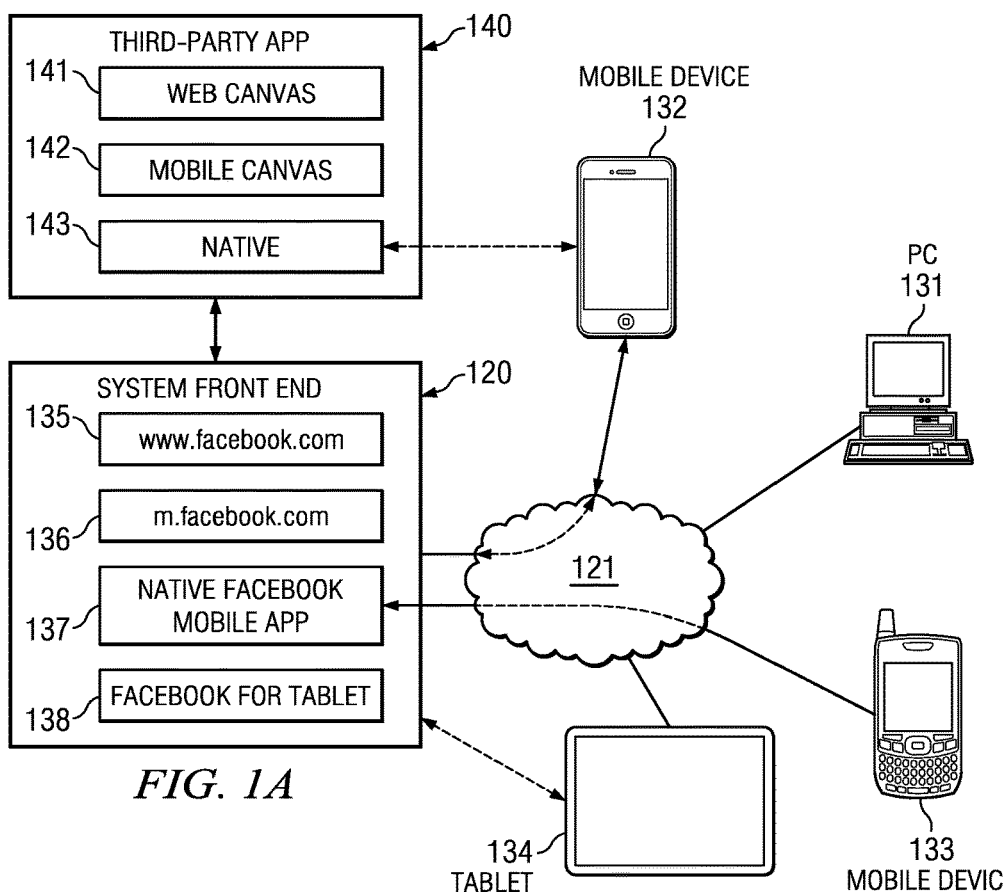
FIG. 1A illustrates an example third-party application communicating through multiple channels.

FIG. 1A illustrates an exemplary social networking system front end 120 that contains multiple distribution channels. A user at various client devices 122 may choose to access the social networking system, and therefore, third-party applications accessing information on the social networking system, via various different channels. For example, in FIG. 1A, PC 131 connects to the standard website 135 through a standard web browser as described above. Similarly, mobile device 133 may connect through a native social networking application resident in its application memory, such as "facebook for iOS", or "facebook for android." in particular embodiments, when accessing system front end 120 from a native application, the social networking system generates views for the user from native facebook mobile app server 137. As another example, a user of mobile device 132 may access m.facebook.com 136 through a lightweight WAP browser, such as the Blackberry browser or Opera Mini. As yet another example, a user of a tablet device 134 may access the social networking system through a dedicated tablet application, such as facebook for iPad. Social networking front end 120 generates views for the various client device 131-134 based upon their specific computing device.

Similarly, users may interact with third-party applications 140 that interact with or otherwise access information from the social networking system. As an example, Mobile device 132 may access a third-party application 140 connected to the social networking system by launching a dedicated native application residing in its program memory. In particular embodiments, users of mobile devices may browse to the traditional social networking web site 135, or by turning on the "mobile view" option of their browser, to the mobile website 136, and interact with a third-party application from either webpage. In theory, each third party application 140 may have up to three versions, one optimized for the web canvas, a lightweight web application optimized for the mobile canvas, and a native application.

However, third-party applications must be developed to function properly with a particular platform, whether the standard web site, a mobile platform, or a native application. The view generated by Farmville that has been optimized for user 131 viewing the standard web page (the "web canvas" platform) will generally be unsuitable for a mobile device. Additionally, particular mobile devices may be unable to support the web canvas version of particular applications. For example, if the web canvas version of Farmville generates a story for display in users' newsfeeds, the users utilizing client device 131 may be able to click the newsfeed story and navigate to Farmville's web-canvas application. However, a user who is viewing his or her newsfeed on a mobile application will only be able to click the link if Farmville has associated a counterpart mobile-canvas application. Otherwise, mobile users are unable to interact with particular newsfeed stories, thereby diminishing their value to the user. In many cases, users mistakenly believe that all links from applications are not clickable from mobile (whether the dedicated social networking application or the mobile site m.facebook.com), thereby damaging the distribution for applications who have built a mobile-optimized version. Additionally, it is desirable to automatically link users of a mobile social networking application to the mobile versions of their web applications as soon as they become available.

Figure 2:
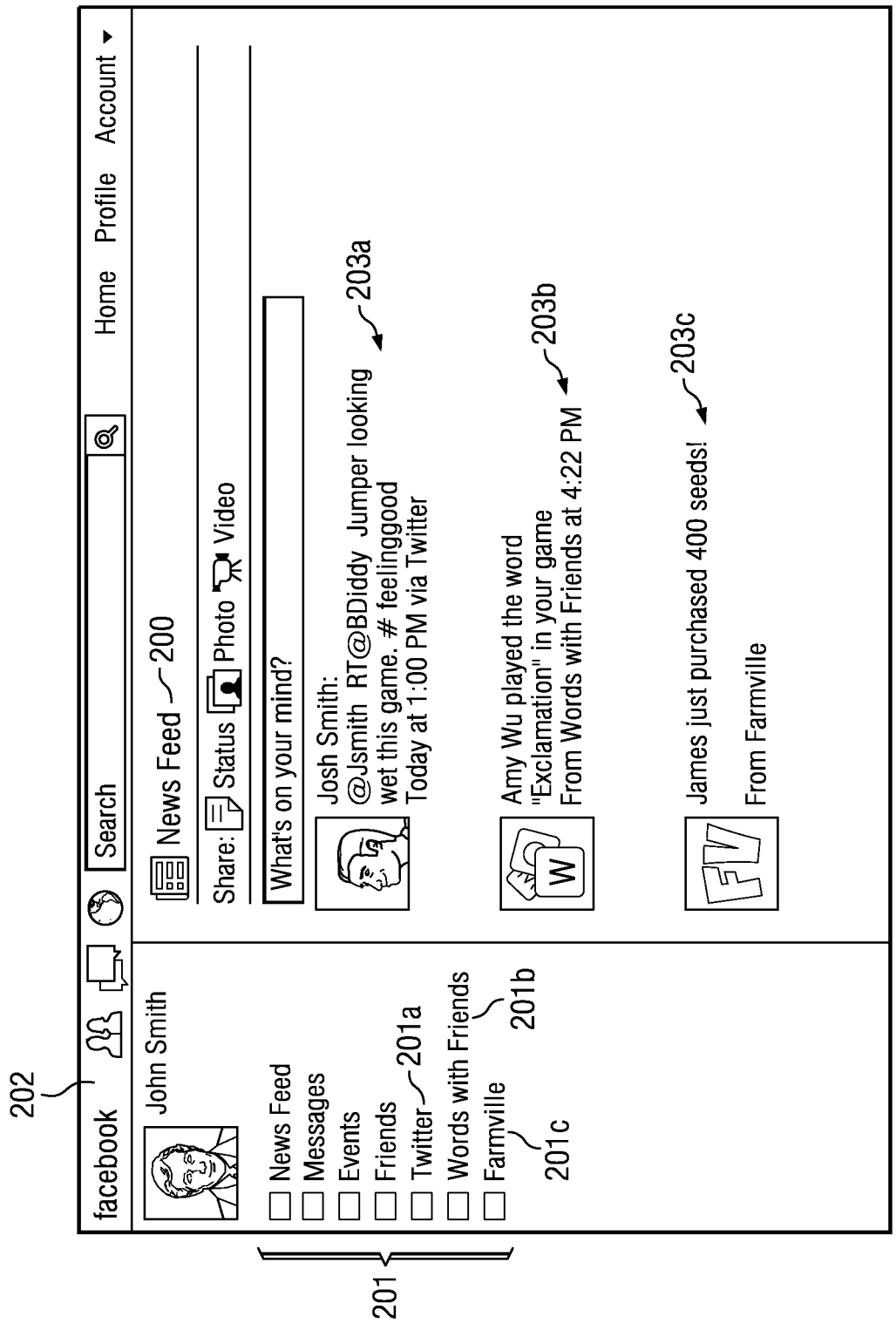
FIG. 2 illustrates an example newsfeed view on a standard web browser.

FIG. 2 illustrates an exemplary profile page and newsfeed 200 when viewed through a standard web browser rather than a mobile site or dedicated mobile application. In particular embodiments, profile 200 contains bookmarks bar 201. Bookmarks bar 201 not only includes standard social networking features provided by the social networking system, such as "Newsfeed, Messages, Events, and Friends" in this example, but also bookmarks to third-party applications the user has installed. In this particular example, the user, "John Smith," has installed third-party applications Twitter 201a, Words with Friends 201b, and Farmville 201c. In particular embodiments, third party applications 201a-c may also generate notifications to the user, such as when a user's tweets have been re-tweeted, or when it is the user's turn in a game of words with friends. In particular embodiments, these notifications appear in notifications indicator 202.

Newsfeed 200 contains, for exemplary purposes, three newsfeed stories 203a, 203b, and 203c, generated by third-party applications 201a, b, and c, respectively. In the standard website, clicking each of newsfeed stories 203a, 203b, and 203c will navigate the user to the web URL of the third-party application. For example, Farmville may only have a web-canvas version of their social networking game. Thus, clicking link 203c navigates the user to the URL of Farmville's web application, for example: apps.facebook.com/Farmville. In particular embodiments, where the application lacks a version optimized for the platform from which a users is accessing the social network, the newsfeed story and its link are simply not displayed.

In particular embodiments, an application developer may, through a system back-end, specify multiple URLs to web canvas and mobile canvas versions of their application. In particular embodiments, the link included in a newsfeed story for a particular third-party application is a relative link that references, depending on the context in which the link is accessed, the appropriate URL to the platform-optimized application. For example, WordsWithFriends may have both a web and mobile canvas version of their game, at URLs: apps.facebook.com/wordswithfriends and apps.m.facebook.com/wordswithfriends, respectively. Newsfeed stories, such as newsfeed story 203b, may all include the relative URL "/wordswithfriends/"; the user is taken to the version of Words With Friends that is optimized for the platform he or she is currently using.

Figure 3:
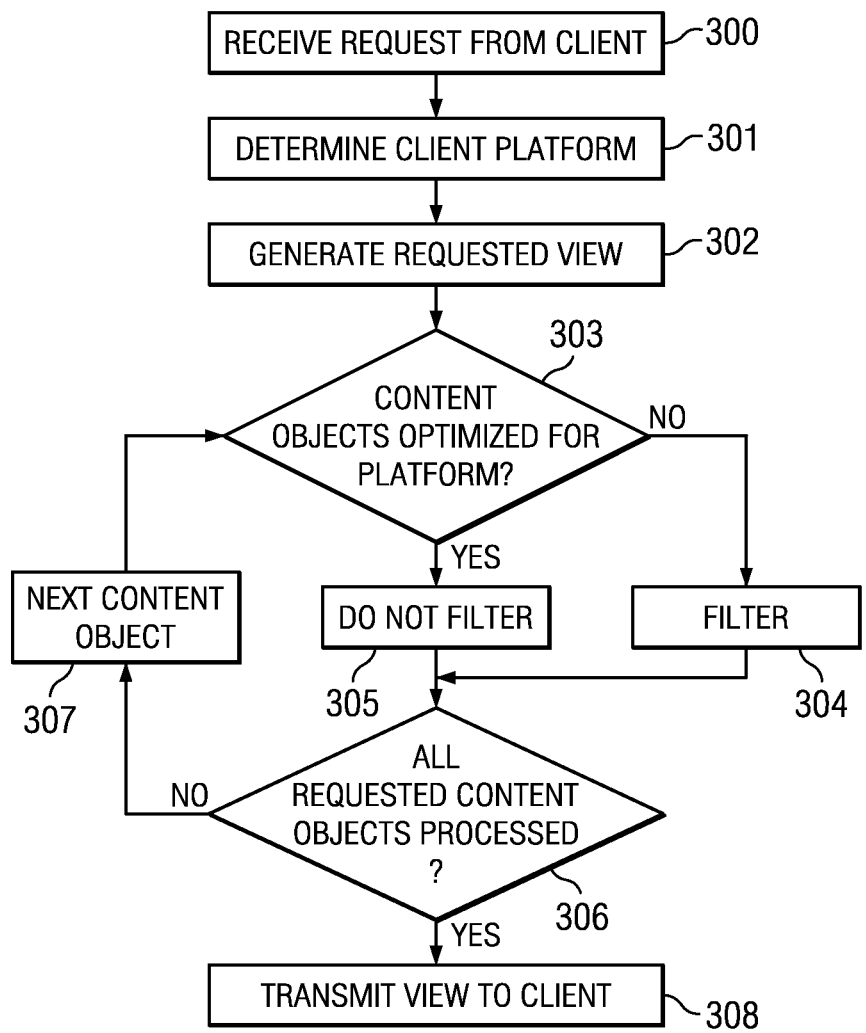
FIG. 3 illustrates a method of filtering notifications based on the client platform.

FIG. 3 illustrates an example method for generating a view for rendering on a particular platform. At Step 300, the process begins by the user requesting a particular view from a social networking system. For the purposes of this application a "view" means any set of content objects, for example, a newsfeed or information view. As another example, the notifications view also comprises a particular view. In particular embodiments, the notification indicator itself comprises a view; although each notification is not individually displayed, the client device must request all unviewed notifications from the social networking system. For the purposes of this disclosure, a "content object" is any piece of information that may be delivered from the social networking system to the client device. This includes bookmarks, messages, notifications, newsfeed stories, "pokes", third-party application interactions, and the like. This disclosure contemplates generating a device or platform specific rendering for any suitable set of information requested from the social networking system.

At Step 301, the social networking system determines the platform from which the client is accessing the social networking system. In particular embodiments, this is achieved by examining the mobile browser ID, or user agent. In particular embodiments, the type of device platform is identified by its Mobile Information Device Profile (MIDP). In particular embodiments, the user-agent field of the HTTP request is utilized to determine the device platform of the client device. This disclosure contemplates any suitable method of determining the platform used by a client.

At Step 302, the social networking system retrieves all the content objects contained in the requested view. For example, if a users requests to view his or her newsfeed, the social networking system will retrieve all the newsfeed stories that make up the newsfeed. As another example, if a user requests his or her notifications, the social networking system will gather all the new notifications. In particular embodiments, the social networking system gathers all the content objects for the requested view among all contexts. For example, if a user bookmarks a mobile application, such as Twitter from his or her mobile social networking application, it will be added to the user's "global" list of bookmarks. Thus, when the user logs into the social networking system via the standard website, the bookmark for Twitter's web-canvas application will appear in the user's bookmarks automatically. Similarly, if a users installs an application to his or her profile using the standard web interface, when the user accesses the social network using a mobile social networking application, the mobile-canvas versions of the newly-added applications, provided that they exist, will automatically appear in the user's mobile view.

At Step 303, the social networking system determines whether the content objects are optimized for the detected platform. For the purposes of this application, "optimized" means either designed for, or at least operable with, the particular context of the device platform, i.e., mobile canvas or web canvas, or the application identifier is linked to a version of the application for the context. For example, in particular embodiments, web canvas applications are HTML5 web applications meant to be launched from a mobile browser. If a user who has installed "Words With Friends" in the web context then attempts to view his or her bookmarks in the mobile context, the social networking system will determine, either from the relative URL as described above, or another form of linkage between the application ID and its specific versions, whether "Words With Friends" has a mobile canvas version optimized for clients utilizing a mobile device.

If the content object is neither optimized nor linked to a platform-optimized version of the content object for the detected client platform, it is filtered out at step 304. Thus, the social networking system does not deliver content objects to a user that are of "low value" to the user; i.e., hyperlinks or newsfeed stories that are not selectable because no mobile optimized version exists for their mobile device, or vice versa. In particular embodiments, notifications are similarly filtered; for example, if Farmville has only a web canvas application and no mobile canvas application, no notifications are delivered to a user's mobile device, because the user cannot launch the application by interacting with the notification from his mobile social networking application. In particular embodiments, where the application possesses a native platform-specific application, such as Farmville for Android, the social networking system determines whether the native application is resident on the client device, and determines that the content object is "optimized" if the application is installed. Thus, in such an embodiment, a user would receive a notification, news story, bookmark, or other content object, that, when selected, would automatically run the native client application.

At Step 305, content object that are optimized for the detected platform, or are linked to an optimized version for the detected platform, are not filtered from the set of content objects. At Step 306, the social networking system checks if it has filtered all the content objects for the requested view, and if not, retrieves the next content object at Step 307, and loops back to Step 303. When the social networking system has processed and filtered all the content objects for the requested view, the social networking system transmits the content objects to the client at Step 308.

Figure 4:
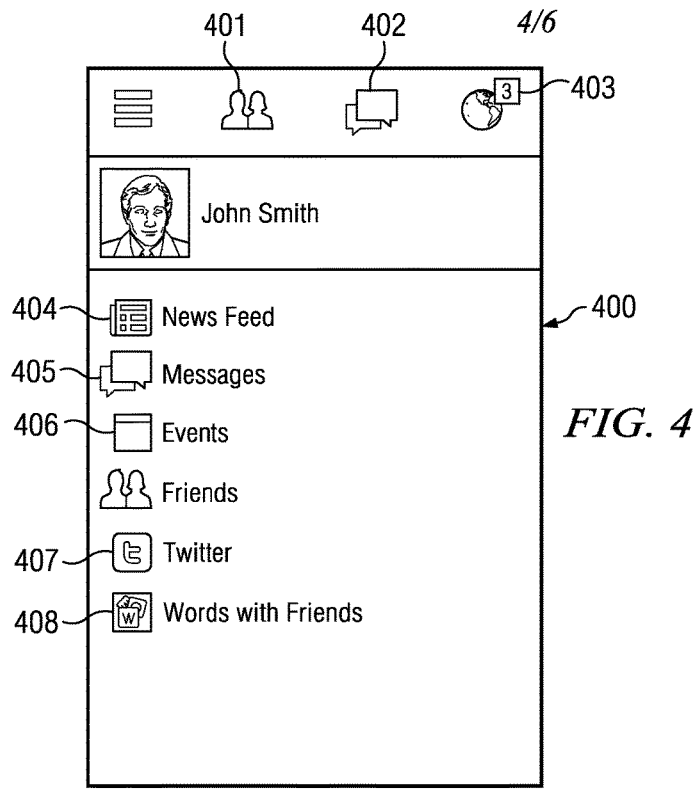
FIG. 4 illustrates an example bookmarks view on a mobile application.

FIG. 4 depicts view delivered to the user of FIG. 3, "John Smith," after requesting his bookmarks 400 from a mobile social networking application. Bookmarks 400 is considered a "view" that contains multiple content objects; i.e., bookmarks 404-408. In particular embodiments, views may be nested; a single view may contain multiple sub-views. For example, bookmark view may include friends 401, messages 402, and notifications 403, all of which may be considered its own view. In order to render, for example, notifications 403, the client device must request a "notifications view" from the social networking system. The social networking system at this time may filter the notifications as described in FIG. 3, and only display the notification indicator for stories that are optimized for the mobile canvas. For example, if the user has 4 notifications, but one is for "Farmville", which lacks a mobile canvas version, the user will only see 3 notifications in his or her notifications view. In particular embodiments, views may be processed in parallel or in series. This disclosure contemplates any hierarchy of views and processing methodology.

Referring back to FIG. 3, the example user has three third-party applications, Twitter, Words With Friends, and Farmville. However, because in this particular example, Farmville lacks an associated mobile canvas version, the bookmark for Farmville is not displayed in the user's bookmark view. In particular embodiments, as discussed above, the mobile social networking application may provide linkage to a native client application, such as "Farmville for Android", and display a bookmark to the client application in bookmarks view 400.

Figure 4A:
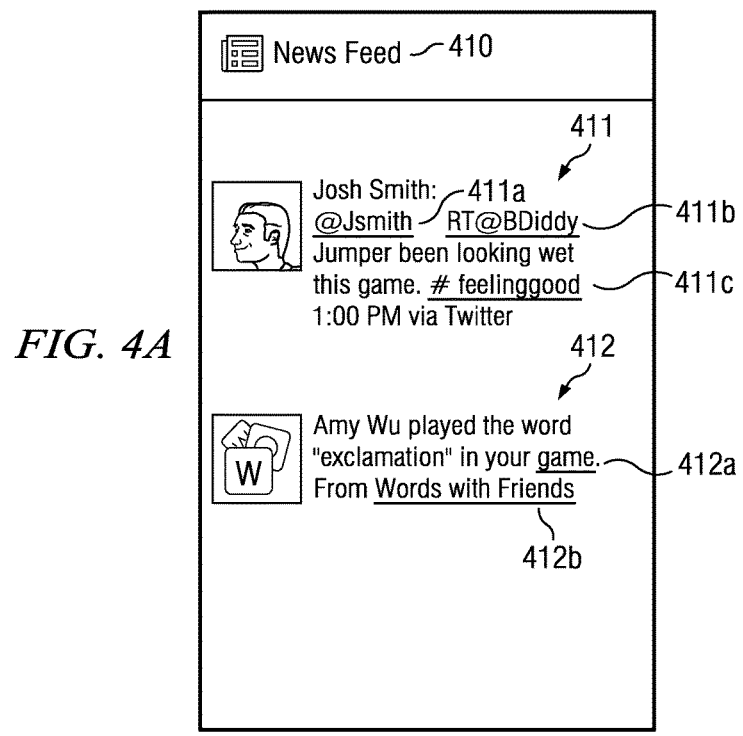
FIG. 4A illustrates an example newsfeed view on a mobile application.

Similarly, FIG. 4A depicts the view delivered to John Smith when he selects newsfeed bookmark 404 on his mobile social networking application. As previously described, newsfeed stories 203a and 203b, generated by Twitter 201a and 201b, respectively, are displayed on newsfeed 410 as mobile newsfeed stories 411 and 412. However, because, in this example, Farmville lacks a mobile canvas version, web context newsfeed story 203c is filtered out by the social networking system. In particular embodiments, newsfeed stories 411 and 412 possess multiple hyperlinks that take the user to the mobile canvas application for the particular application. For example, Usernames 411a and 411b in newsfeed story 411 may take the user to the Twitter mobile canvas application and automatically insert an "@" mention to the usernames 411a or 411b. Similarly, hash tag 411c, when selected, may take the user to the mobile web application for Twitter and automatically instruct the application to display all tweets trending with the hash tag "#feelinggood." Similarly, for newsfeed story 412, link 412a may automatically navigate the user to his current Words With Friends game with the user "Amy."

Figure 5:
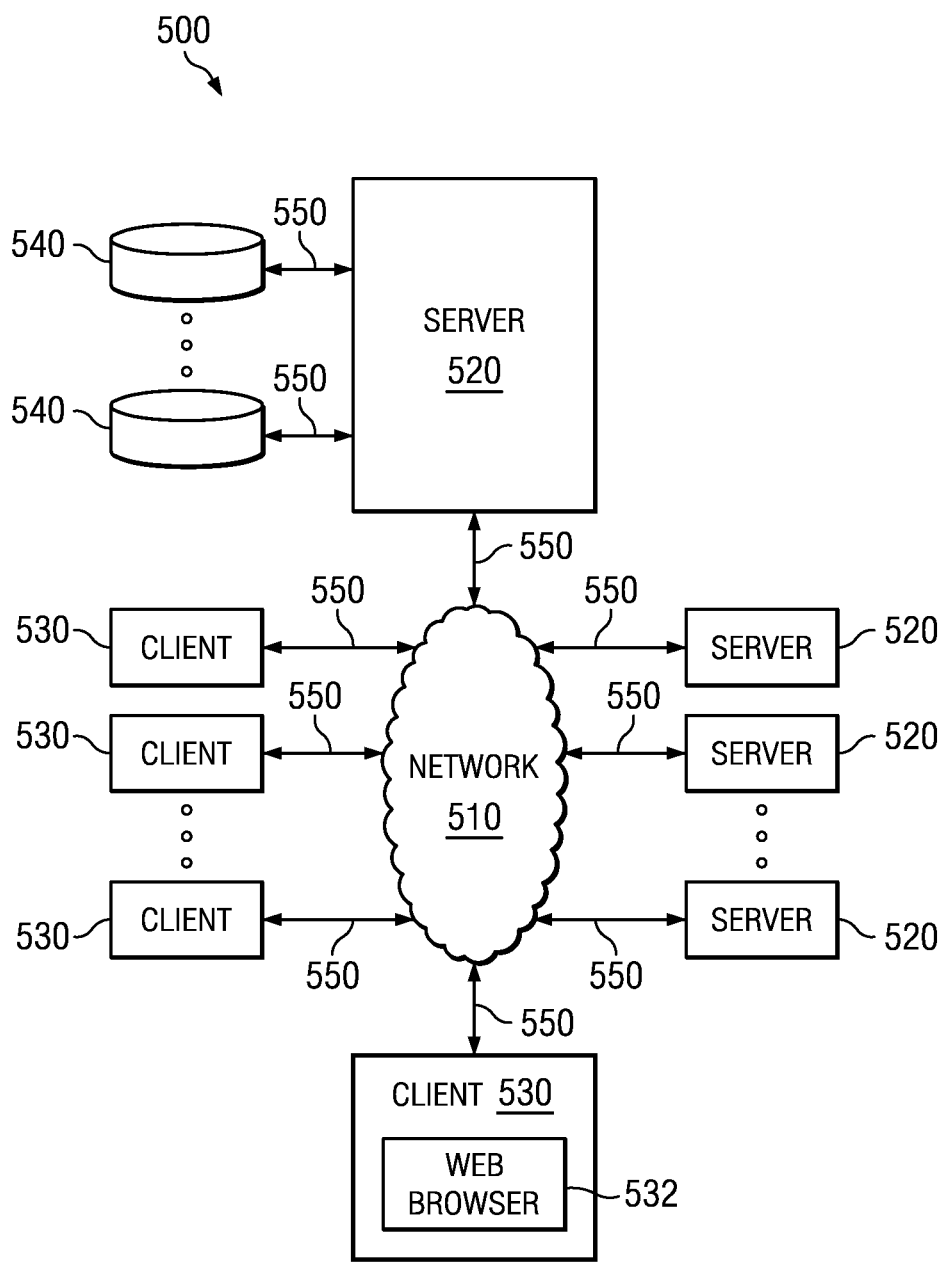
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520.

In particular embodiments, one or more data storages 540 may be communicatively linked to one or more servers 520 via one or more links 550. In particular embodiments, data storages 540 may be used to store various types of information Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. Herein, reference to a web page encompasses one or more corresponding web page files (which a browser may use to render the web page) and vice versa, where appropriate.

Figure 6:
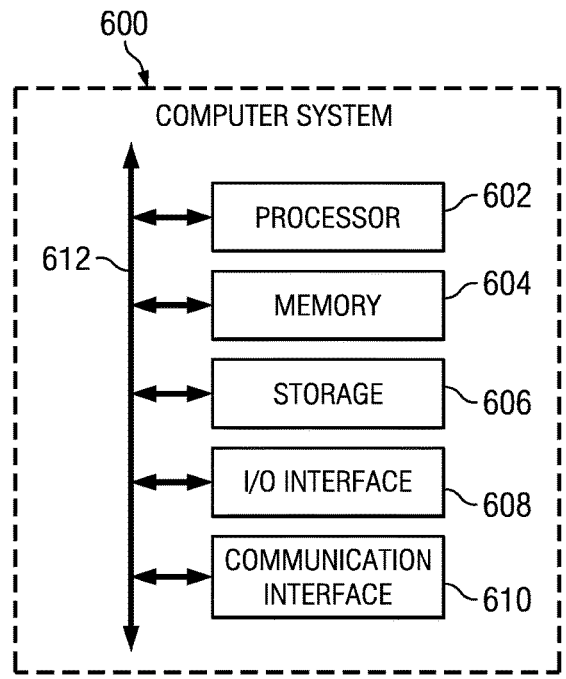
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. Bus 612 may include one or more buses 612, where appropriate. Although this disclosure describes and illustrates a particular bus, this disclosure contemplates any suitable bus or interconnect.

Figure 7:
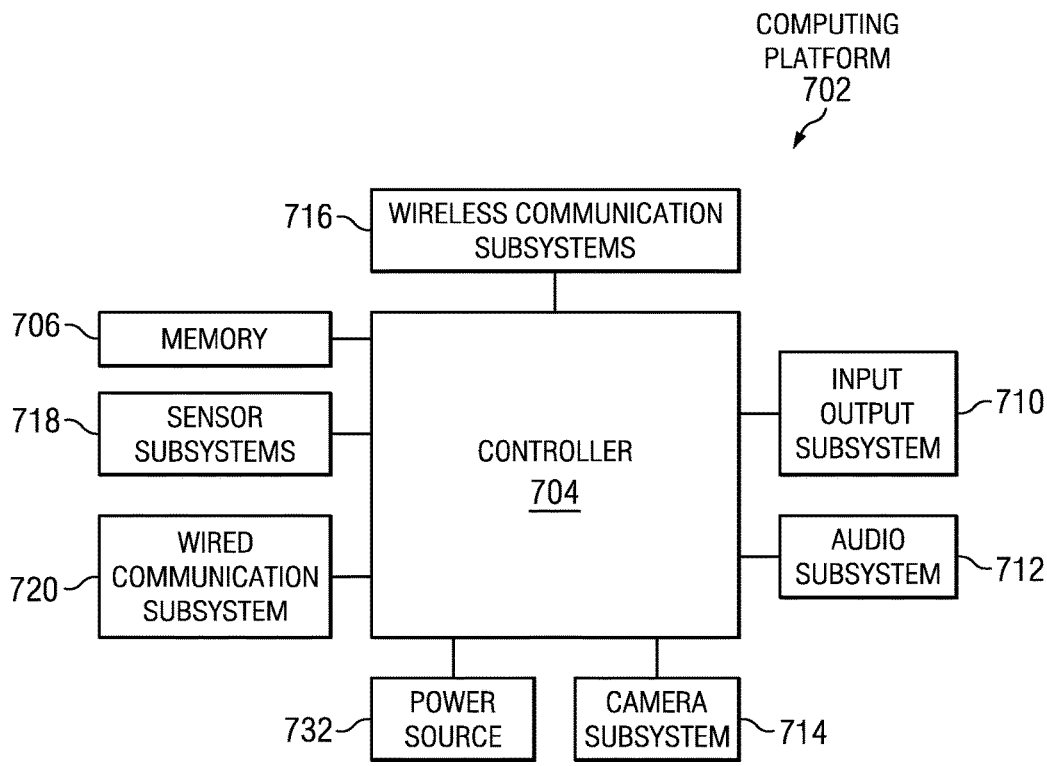
FIG. 7 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 7 shows a schematic representation of the main components of an example computing platform 702, according to various particular embodiments. Multipoint sensing devices generally include a controller 704 which may comprise a microcontroller or one or more processors configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 708 described below) and/or data may be physically stored within a memory block 706 that is operatively coupled to controller 704.

Memory block 706 encompasses one or more storage media and generally provides a place to store computer code (e.g., software and/or firmware) and data that are used by the computing platform 702. By way of example, memory block 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory block 706 may also include one or more fixed storage devices in the form of, by way of example, solid-state hard disk drives (HDDs), among other suitable forms of memory coupled bi-directionally to controller 704. Information may also reside on a removable storage medium loaded into or installed in multipoint sensing devices when needed. By way of example, any of a number of suitable memory cards may be loaded into computing platform 702 on a temporary or permanent basis.

Controller 704 is also generally coupled to a variety of interfaces such as graphics control, video interface, input interface, output interface, and storage interface, and network interface, and these interfaces in turn are coupled to the appropriate devices. In certain embodiment, Controller 704 may connected to an input structure 714 and display 716 may be provided together, such an in the case of a touch-screen where a touch sensitive mechanism is provided in conjunction with the display 716. In such embodiments, the user may select or interact with displayed interface elements via the touch sensitive mechanism. In this way, the displayed interface may provide interactive functionality, allowing a user to navigate the displayed interface by touching the display 716.

Electric signals (e.g., analog) may be produced by microphone 710 and fed to earpiece 712. Controller 704 may receive instruction signals from input structure 714 and control the operation of display 716. By way of example, display 716 may incorporate liquid crystal display (LCD), light emitting diode (LED), Interferometric modulator display (IMOD), or any other suitable display technology. Audio signals may be transmitted and received by means of an antenna 718 that may be connected through a radio interface 720 or audio input interface such as microphone 724 to codec 722 configured to process signals under control of controller 704. Additionally, multipoint sensing devices may be powered power source 732.

Mobile device may also include one or more user input devices 734 (other than input structure 714) that are operatively coupled to the controller 704. Generally, input devices 734 are configured to transfer data, commands and responses from the outside world into multipoint sensing devices. By way of example, mobile device may include a keyboard or mouse. Input devices 734 may also include one or more hard buttons.

Display device 716 is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display 716 in order to initiate functions and tasks associated therewith.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    receiving, by a server computing machine, a set of applications from one or more third-party application developers, wherein each application is classified as either a desktop application or a mobile application, wherein a desktop application is configured for display on a desktop computing device and a mobile application is configured for display on a mobile computing device;
    receiving, by a server computing machine, a request from a user device of a first user, for a view of a newsfeed interface of an online social network that is to be displayed on the user device of the first user, wherein the view comprises one or more social-network-newsfeed stories associated with notifications originating from one or more applications of the set of applications, wherein each of the social-network-newsfeed stories describes an interaction of a second user with a particular application of the set of applications, wherein the second user is a social-network connection of the first user;
    determining whether the user device of the first user is classified as a desktop computing device or a mobile computing device;
    if the user device of the first user is classified as a desktop computing device:
        filtering out social-network-newsfeed stories associated with notifications originating from mobile applications from the requested view;
    else if the user device is classified as a mobile computing device:
        filtering out social-network-newsfeed stories associated with notifications originating from desktop applications from the requested view; and
    sending, to the user device, the requested view comprising one or more social-network-newsfeed stories that are not filtered out.

2. The method of claim 1, wherein the user device of the first user is determined to be classified as a desktop computing device or a mobile computing device based at least in part on one or more of the following:
    a Mobile Information Device Profile (MIDP) received from the user device; or
    a user-agent field of an HTTP request received from the user device.

3. The method of claim 1, wherein filtering out the social-network-newsfeed stories associated with notifications originating from desktop applications from the requested view comprises:
    determining that the respective desktop applications are not optimized for a mobile computing device.

4. The method of claim 3, wherein the respective applications are determined to not be optimized for a mobile computing device if:
    the respective applications are determined to not be operable on a mobile computing device.

5. The method of claim 1, wherein one or more of the social-network-newsfeed stories associated with notifications originating from the applications comprise links that are configured to launch the respective applications.

6. The method of claim 1, wherein filtering out the social-network-newsfeed stories associated with notifications originating from mobile applications from the requested view comprises:
    determining that the respective mobile applications are not optimized for a desktop computing device.

7. The method of claim 6, wherein the respective applications are determined to not be optimized for a desktop computing device if:
    the respective applications are determined to not be operable on a desktop computing device.

8. One or more computer-readable non-transitory storage media embodying software that is operable when executed to:
    receive a set of applications from one or more third-party application developers, wherein each application is classified as either a desktop application or a mobile application, wherein a desktop application is configured for display on a desktop computing device and a mobile application is configured for display on a mobile computing device;
    receive a request from a user device of a first user, for a view of a newsfeed interface of an online social network that is to be displayed on the user device of the first user, wherein the view comprises one or more social-network-newsfeed stories associated with notifications originating from one or more applications of the set of applications, wherein each of the social-network-newsfeed stories describes an interaction of a second user with a particular application of the set of applications, wherein the second user is a social-network connection of the first user;
    determine whether the user device of the first user is classified as a desktop computing device or a mobile computing device;
    if the user device of the first user is classified as a desktop computing device:
        filter out social-network-newsfeed stories associated with notifications originating from mobile applications from the requested view;

else if the user device is classified as a mobile computing device:
  filter out social-network-newsfeed stories associated with notifications originating from desktop applications from the requested view; and
  send, to the user device, the requested view comprising one or more social-network-newsfeed stories that are not filtered out.

9. The media of claim 8, wherein the user device of the first user is determined to be classified as a desktop computing device or a mobile computing device based at least in part on one or more of the following:
  a Mobile Information Device Profile (MIDP) received form the user device; or
  a user-agent field of an http request received from the user device.

10. The media of claim 8, wherein the software is further operable when filtering out the social-network-newsfeed stories associated with notifications originating from desktop applications from the requested view to:
  determine that the respective desktop applications are not optimized for a mobile computing device.

11. The media of claim 10, wherein the respective applications are determined to not be optimized for a mobile computing device if:
  the respective applications are not operable on a mobile computing device.

12. The media of claim 8, wherein one or more of the social-network-newsfeed stories associated with notifications originating from the applications comprise links that are configured to launch the respective applications.

13. A system comprising:
one or more processors; and
a memory coupled to the processors comprising instructions executable by the processors, the processors being operable when executing the instructions to:
  receive a set of applications from one or more third-party application developers, wherein each application is classified as either a desktop application or a mobile application, wherein a desktop application is configured for display on a desktop computing device and a mobile application is configured for display on a mobile computing device;
  receive a request from a user device of a first user, for a view of a newsfeed interface of an online social network that is to be displayed on the user device of the first user, wherein the view comprises one or more social-network-newsfeed stories associated with notifications originating from one or more applications of the set of applications, wherein each of the social-network-newsfeed stories describes an interaction of a second user with a particular application of the set of applications, wherein the second user is a social-network connection of the first user;
  determine whether the user device of the first user is classified as a desktop computing device or a mobile computing device;
  if the user device of the first user is classified as a desktop computing device:
    filter out social-network-newsfeed stories associated with notifications originating from mobile applications from the requested view; else if the user device is classified as a mobile computing device:
    filter out social-network-newsfeed stories associated with notifications originating from desktop applications from the requested view; and
  send, to the user device, the requested view comprising one or more social-network-newsfeed stories that are not filtered out.

14. The system of claim 13, wherein the user device of the first user is determined to be classified as a desktop computing device or a mobile computing device based at least in part on one or more of the following:
  a Mobile Information Device Profile (MIDP) received form the user device; or
  a user-agent field of an http request received from the user device.

15. The system of claim 13, wherein the processors are further operable when filtering out the social-network-newsfeed stories associated with notifications originating from desktop applications from the requested view to:
  determine that the respective desktop applications are not optimized for a mobile computing device.

16. The system of claim 15, wherein the respective applications are determined to not be optimized for a mobile computing device if:
  the respective applications are not operable on a mobile computing device.

17. The system of claim 13, wherein one or more of the social-network-newsfeed stories associated with notifications originating from the applications comprise links that are configured to launch the respective applications.

* * * * *